(12) United States Patent
Brady et al.

(10) Patent No.: US 11,373,505 B2
(45) Date of Patent: *Jun. 28, 2022

(54) ALERT SYSTEM FOR INTERNET OF THINGS (IOT) DEVICES

(71) Applicant: INTEL CORPORATION, Santa Clara, CA (US)

(72) Inventors: John Brady, Celbridge (IE); Keith Nolan, Mullingar (IE); Michael Nolan, Maynooth (IE); Mark Kelly, Dublin (IE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,092

(22) Filed: Mar. 16, 2020

(65) Prior Publication Data

US 2020/0357259 A1    Nov. 12, 2020

Related U.S. Application Data

(63) Continuation of application No. 15/754,787, filed as application No. PCT/US2015/052170 on Sep. 25, 2015, now Pat. No. 10,621,849.

(51) Int. Cl.
G08B 21/00    (2006.01)
G08B 21/18    (2006.01)
(Continued)

(52) U.S. Cl.
CPC .......... *G08B 21/182* (2013.01); *G05F 1/00* (2013.01); *G08B 25/007* (2013.01); *G08B 25/08* (2013.01);
(Continued)

(58) Field of Classification Search
CPC .... G08B 21/182; G08B 25/007; G08B 25/08; G08B 25/10; G08B 29/10; H04W 4/38;
(Continued)

(56) References Cited

U.S. PATENT DOCUMENTS 5,600,230 A * 2/1997 Dunstan ................ H02J 7/0048
340/636.13
10,621,849 B2    4/2020 Brady et al.
(Continued)

FOREIGN PATENT DOCUMENTS

EP    3353759    8/2018
JP    2010049390    3/2010
(Continued)

OTHER PUBLICATIONS

"European Application Serial No. 15904916.2, Communication Pursuant to Article 94(3) EPC dated Jul. 14, 2020", 6 pgs.
(Continued)

*Primary Examiner* — Kerri L McNally
*Assistant Examiner* — Thang D Tran
(74) *Attorney, Agent, or Firm* — Schwegman Lundberg & Woessner, P.A.

(57) ABSTRACT

A method and apparatus for monitoring operational parameters in an IoT device is provided. An exemplary method includes performing a statistical analysis of a system metric. A determination is made as to whether an alert limit has been breached. If so, a message is constructed and dispatched to a server.

26 Claims, 6 Drawing Sheets

(51) Int. Cl.
  *G08B 25/10* (2006.01)
  *H04L 67/12* (2022.01)
  *G08B 25/08* (2006.01)
  *H04L 67/55* (2022.01)
  *G08B 25/00* (2006.01)
  *G08B 29/10* (2006.01)
  *G05F 1/00* (2006.01)
  *H04W 4/38* (2018.01)
  *H04L 69/28* (2022.01)

(52) U.S. Cl.
  CPC ............. *G08B 25/10* (2013.01); *G08B 29/10* (2013.01); *H04L 67/12* (2013.01); *H04L 67/26* (2013.01); *H04W 4/38* (2018.02); *H04L 69/28* (2013.01)

(58) Field of Classification Search
  CPC . G05F 1/00; H04L 67/12; H04L 67/26; H04L 69/28
  USPC .......................................................... 340/635
  See application file for complete search history.

(56) References Cited

U.S. PATENT DOCUMENTS

| | | |
|---|---|---|
| 2002/0194326 A1 | 12/2002 | Gold et al. |
| 2003/0101373 A1* | 5/2003 | Freyman ............ H04Q 11/0471 714/14 |
| 2003/0135773 A1* | 7/2003 | Zhang ........................ G06F 1/28 713/340 |
| 2004/0116822 A1* | 6/2004 | Lindsey ................. G01K 13/20 600/549 |
| 2004/0164741 A1* | 8/2004 | Wang ........................ H02J 9/06 324/426 |
| 2004/0199573 A1 | 10/2004 | Schwartz et al. |
| 2005/0062600 A1* | 3/2005 | Olsen ..................... F25D 29/008 340/506 |
| 2005/0134284 A1* | 6/2005 | Hoff ................... G05B 23/0256 324/511 |
| 2006/0093337 A1* | 5/2006 | Chan ..................... A45D 20/30 392/385 |
| 2006/0212161 A1* | 9/2006 | Bhat ....................... B29C 49/78 700/197 |
| 2007/0076733 A1* | 4/2007 | Bosseler ................. G06F 3/126 370/412 |
| 2007/0233402 A1* | 10/2007 | Li ............................ G06F 1/206 702/33 |
| 2007/0297893 A1* | 12/2007 | Alon ..................... F04D 25/166 415/47 |
| 2008/0106425 A1 | 5/2008 | Deaver et al. |
| 2008/0170947 A1* | 7/2008 | Sutardja ................. G06F 1/206 417/32 |
| 2010/0268997 A1* | 10/2010 | Planki ................. G06F 11/3058 714/47.1 |
| 2011/0140898 A1* | 6/2011 | Berke .................... G08B 21/182 340/584 |
| 2011/0298301 A1* | 12/2011 | Wong ....................... G01D 4/004 307/116 |
| 2012/0066519 A1* | 3/2012 | El-Essawy ............. H05K 7/1498 713/300 |
| 2012/0283890 A1 | 11/2012 | Fu et al. |
| 2013/0018625 A1* | 1/2013 | Lehman ................. G01R 22/10 702/130 |
| 2013/0073245 A1 | 3/2013 | Bhagwat et al. |
| 2013/0093592 A1 | 4/2013 | Lan et al. |
| 2013/0183924 A1* | 7/2013 | Saigh ..................... A61K 31/198 455/404.2 |
| 2013/0209090 A1* | 8/2013 | Rope ..................... H04B 17/101 398/25 |
| 2014/0002027 A1* | 1/2014 | Guan ..................... H02J 7/0014 320/128 |
| 2014/0028462 A1* | 1/2014 | Lawson ................ H04Q 9/00 340/870.01 |
| 2014/0163814 A1* | 6/2014 | Rousu .................... G07C 5/0808 701/33.9 |
| 2014/0203935 A1* | 7/2014 | Kates ..................... G08B 25/009 340/540 |
| 2014/0266793 A1* | 9/2014 | Velado .................... B63B 79/40 340/870.16 |
| 2014/0269811 A1* | 9/2014 | Maleki ................... G01K 13/00 374/1 |
| 2014/0330756 A1* | 11/2014 | Thapliyal ............... G06N 5/025 706/12 |
| 2015/0059200 A1* | 3/2015 | Prajescu ................. D06F 58/30 34/282 |
| 2015/0067154 A1* | 3/2015 | Ly ........................... H04L 67/26 709/224 |
| 2015/0071139 A1* | 3/2015 | Nix ....................... H04W 12/02 370/311 |
| 2015/0074177 A1 | 3/2015 | Yamamoto et al. |
| 2015/0102756 A1* | 4/2015 | Okita ...................... H02P 29/60 318/473 |
| 2015/0168268 A1* | 6/2015 | Fish ........................ G01H 1/003 374/142 |
| 2015/0189509 A1 | 7/2015 | Sheikh et al. |
| 2015/0198938 A1* | 7/2015 | Steele .................... G05B 15/02 700/275 |
| 2015/0211529 A1 | 7/2015 | Minteer et al. |
| 2015/0233594 A1* | 8/2015 | Abe ......................... F24F 11/30 700/276 |
| 2015/0243155 A1* | 8/2015 | Xiong ................. H04B 10/0795 398/135 |
| 2015/0257221 A1 | 9/2015 | McDermott et al. |
| 2015/0279193 A1* | 10/2015 | Federspiel ............. G08B 31/00 340/517 |
| 2015/0325060 A1 | 11/2015 | Tart et al. |
| 2015/0338281 A1* | 11/2015 | Ross ....................... G01K 3/14 236/44 A |
| 2015/0346706 A1* | 12/2015 | Gendelman .......... G05B 19/058 700/79 |
| 2015/0381737 A1* | 12/2015 | Quinn ..................... H04L 67/02 709/217 |
| 2016/0021013 A1 | 1/2016 | Vasseur et al. |
| 2016/0042289 A1* | 2/2016 | Poola ...................... H04L 67/10 706/52 |
| 2016/0072891 A1* | 3/2016 | Joshi ..................... G06Q 30/0631 370/254 |
| 2016/0105305 A1* | 4/2016 | Pignataro ............ H04L 41/0893 709/223 |
| 2016/0275706 A1* | 9/2016 | Nolan .................... G06T 11/001 |
| 2016/0316485 A1 | 10/2016 | Kumar et al. |
| 2016/0343225 A1* | 11/2016 | Lee ......................... G08B 17/06 |
| 2016/0362953 A1 | 12/2016 | Bedrossian |
| 2016/0378891 A1 | 12/2016 | Deodhar et al. |
| 2016/0381071 A1* | 12/2016 | Tatourian ............ H04L 63/1425 726/23 |
| 2017/0005857 A1* | 1/2017 | Reiss ..................... H04L 41/0609 |
| 2017/0006141 A1* | 1/2017 | Bhadra ................... H04W 84/18 |
| 2017/0061770 A1* | 3/2017 | DeLuca ................. G08B 5/22 |
| 2017/0078435 A1 | 3/2017 | Babol et al. |
| 2017/0185785 A1 | 6/2017 | Vorona et al. |
| 2018/0247515 A1 | 8/2018 | Brady et al. |

FOREIGN PATENT DOCUMENTS

| | | |
|---|---|---|
| KR | 20060100182 A | 9/2006 |
| KR | 20070048475 A | 5/2007 |
| WO | 2017052578 | 3/2017 |

OTHER PUBLICATIONS

"U.S. Appl. No. 15/754,787, Non Final Office Action dated Jan. 11, 2019", 34 pgs.
"U.S. Appl. No. 15/754,787, Response filed May 13, 2019 to Non Final Office Action dated Jan. 11, 2019", 28 pgs.
"U.S. Appl. No. 15/754,787, Final Office Action dated Jun. 13, 2019", 29 pgs.
"U.S. Appl. No. 15/754,787, Response filed Oct. 15, 2019 to Final Office Action dated Jun. 13, 2019", 27 pgs.

(56) References Cited

OTHER PUBLICATIONS

"U.S. Appl. No. 15/754,787, Examiner Interview Summary dated Oct. 16, 2019", 3 pgs.
"U.S. Appl. No. 15/754,787, Notice of Allowance dated Dec. 2, 2019", 12 pgs.
"International Application Serial No. PCT US2015 052170, International Preliminary Report on Patentability dated Apr. 5, 2018", 9 pgs.
"European Application Serial No. 15904916.2, Extended European Search Report dated Apr. 18, 2019", 10 pgs.
"European Application Serial No. 15904916.2, Response filed Nov. 18, 2019 to Extended European Search Report dated Apr. 18, 2019", 18 pgs.
International Search Report and Written Opinion for PCT Application No. PCT/US2015/052170, dated Jun. 7, 2016, 10 pages.
"European Application Serial No. 15904916.2, Communication Pursuant to Article 94(3) EPC dated Mar. 16, 2021", 5 pgs.
"European Application Serial No. 15904916.2, Communication Pursuant to Article 94(3) EPC dated Jul. 14, 2020", 12 pgs.
"European Application Serial No. 15904916.2, Response filed Jul. 13, 2021 to Communication Pursuant to Article 94(3) EPC dated Mar. 16, 2021", 12 pgs.
"European Application Serial No. 15904916.2, Communication Pursuant to Article 94(3) EPC dated Jan. 18, 2022", 6 pgs.

\* cited by examiner

ALERT SYSTEM FOR INTERNET OF THINGS (IOT) DEVICES

CROSS REFERNECE TO RELATED APPLICATIONS

This application is a continuation application of U.S. Patent application serial No. 15/754,787 filed on Feb. 23, 2018, the content of which is incorporated by reference as if set forth herein in its entirety, and which pursuant to 35 U.S.C. § 371, is the United States National Stage Application of International Patent Application No. PCT/US2015/052170, filed on Sep. 25, 2015, the content of which is incorporated by reference as if set forth herein in its entirety.

TECHNICAL FIELD

The present techniques relate generally to Internet of Things (IoT) devices. More specifically the present techniques relate to devices that can send alerts when preselected operational limits are exceeded.

BACKGROUND

It has been estimated that the Internet of Things (IoT) may bring Internet connectivity to 50 billion devices by 2020. For organizations, the fault management of these devices in terms of detecting and diagnosing abnormal operations on specific devices may be of great importance. Maximizing the operational lifetime and uptime of the devices and their services may require the intelligent analysis of operational data from the device. However, as large numbers of devices are implemented, a central controlling and monitoring of the devices may not be scalable. Further, significant network traffic may be generated, resulting in higher costs.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
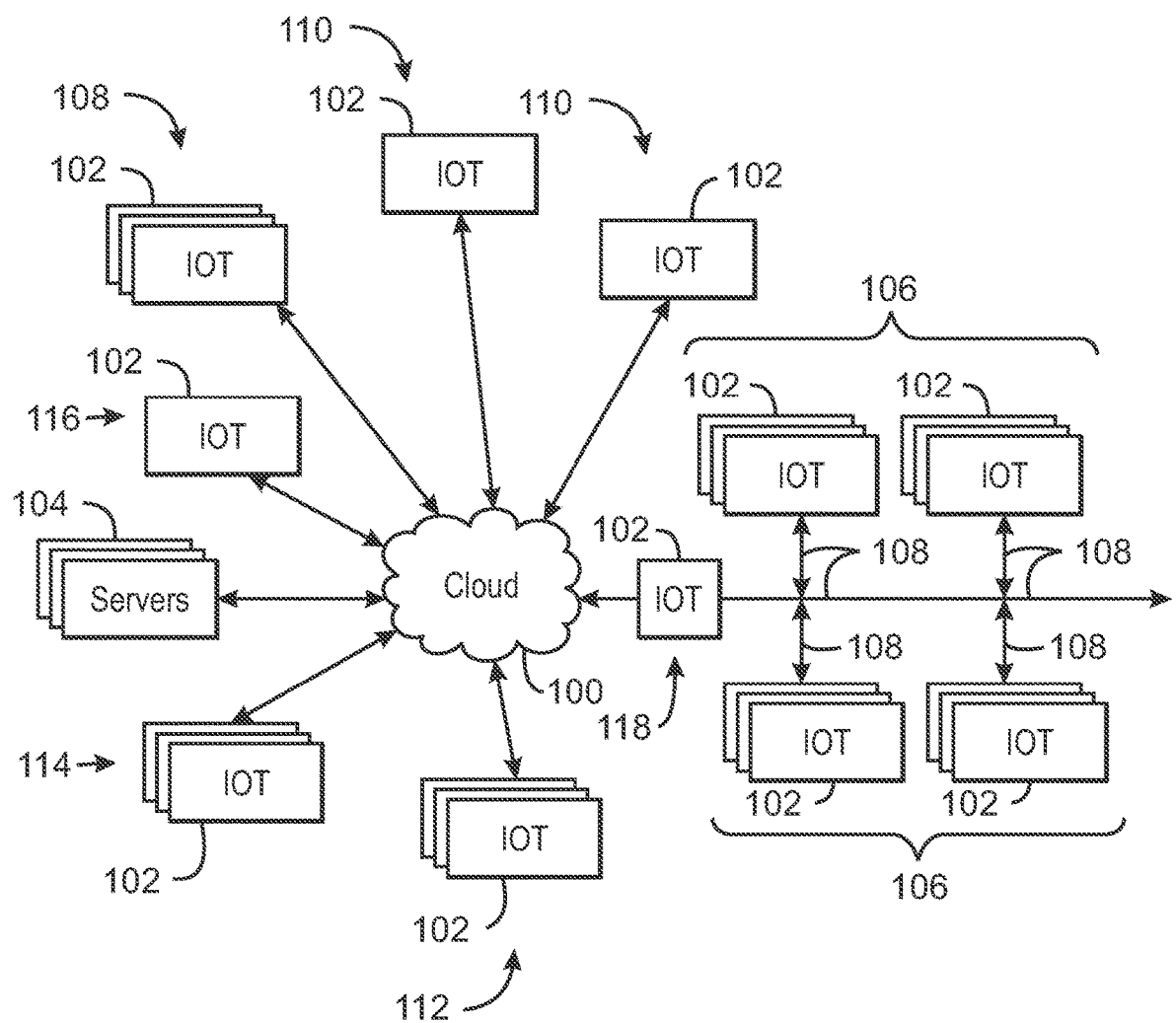
FIG. 1 is a drawing of a cloud computing network in communication with a number of Internet of Things (IoT) devices, at least some of which are communicating with servers.

The internet of things (IoT) is a concept in which a large number of computing devices are interconnected to each other and to the Internet to provide functionality and data acquisition at very low levels. For example, IoT networks may include commercial and home automation devices, such as water distribution systems, electric power distribution systems, pipeline control systems, plant control systems, light switches, thermostats, locks, cameras, alarms, motion sensors, and the like. These devices, termed IoT devices herein, may be accessible through remote computers, servers, and other systems, for example, to control systems or access data.

In addition to network loading, many of the IoT devices may have limited resources, e.g., with constraints on their memory size, computing power, communication capabilities, and available power, among others. The operating lifetime and uptime of an IoT device may be adversely affected by these issues due to insufficient memory and storage space, overheating, lack of power, and loss of connectivity, among others. Accordingly, there may be a significant technical burden on a system operator to quickly identify and diagnose IoT devices that have resource exhaustion issues. In remotely deployed and unattended systems, IoT devices may not be able to resolve the issues without human intervention.

Currently, instrumentation and fault detection software packages report time series based metric data periodically during normal operation. However, reporting machine data during normal operations results in the unnecessary consumption of power and bandwidth for transmitting the data. Further, the monitoring process may be centrally controlled and triggered by signaling or other external polling events. The large number of IoT devices that may be implemented may make scaling this type of reporting solution unfeasible. For example, conveying telemetry information for the system via a wireless communications network adds both monetary costs and energy demand on systems that may be constrained. Accordingly, return on investment may be less due to the increased operating costs incurred. Further, power-constrained devices may have a shorter operating lifetime.

The techniques described herein may address the current deficiencies with available instrumentation and fault detection software for constrained devices. The techniques provide the IoT devices with a monitoring agent that reports, e.g., by sending a message, when an observed metric exceeds a threshold or other functional measure, which may be termed an alert limit. The techniques may use the monitoring system to determine if a system characteristic is exhibiting characteristics that breach the alert limit, for example, if the amount of random access memory (RAM) used by a system exceeds a predefined high watermark. Thus, instead of sending a continuous data stream to report a metric, an alert message may only be sent if the alert limit is breached, e.g., if a value is above or below the alert limit. This may result in a substantial reduction in the telemetry messaging and communications network load requirements for remotely-deployed unattended IoT devices.

In addition to a single value threshold, an alert limit may include any number of calculated values, such as correlations between multiple values, trends in operation parameters, and the like. This may allow more complex conditions to trigger a message, for example, if a current increase in RAM usage indicates that a limit will be breached at a specific point in time. The monitoring agent may also remotely update the alert limit being monitored.

The monitoring agent may use a configurable sample window length to control the overhead for the monitoring agent, e.g., limiting the amount of device memory required to store input, intermediate values used as part of a transformation, and output samples. The window may be used to moderate loading on a constrained IoT device, and may be adjusted during operation.

The monitoring agent may determine the severity of the breach of the alert limit, or alert condition, using a dynamically configurable alert scoring scheme. The scheme may be used to indicate the severity of an alert condition when it arises on a remote unattended IoT device. The configurable nature of the system enables the alert detection system to be dynamically tailored to best suit the intended deployment scenario.

FIG. 1 is a drawing of a cloud computing network 100 in communication with a number of Internet of Things (IoT) devices 102, at least some of which are communicating with servers 104. The cloud computing network 100 may represent the Internet, or may be a wide area network, such as a proprietary network for a company. The IoT devices 102 may include any number of different types of devices, grouped in various combinations. For example, a pipeline group 106 may include IoT devices 102 along a pipeline that are in communication with the cloud computing network 100 through a sub-network 108, such as a local area network, wireless local area network, and the like. The IoT devices 102 in the group 106 may communicate with a server 104 through the cloud computing network 100.

Other groups of IoT devices 102 may include remote weather stations 109, local information terminals 110, alarm systems 112, automated teller machines 114, and alarm panels 116, among many others. Each of these IoT devices 102 may be in communication with other IoT devices 102, with servers 104, or both. The IoT devices 102 may use another IoT device 102 as a constrained gateway 118 to communicate with the cloud.

As can be seen from FIG. 1, a large number of IoT devices 102 may be communicating through the cloud computing network 100. Each of these IoT devices 102 may generate a time sequenced data stream including for example, a core sensor data stream. For example, for a pipeline group 106 of IoT devices 102, the core sensor data stream may include flow rates, temperature, and the like. However, if each of these IoT devices is also generating a time sequenced data stream to report operational parameters, including such system metrics as battery reserve, memory usage, sensor functionality, and the like, the increase on network loading may be substantial, as discussed further with respect to FIG. 3.

Further, a time sequenced data stream of operation parameters may be difficult to interpret without expertise. In addition, many of the IoT devices 102 may be located in remote sites, making access inconvenient. For example, the IoT devices 102 of the pipeline group 106 may be located along a pipeline that travels for many miles through rural areas. Weather stations 109 may also be located in rural or relatively inaccessible locations, such as mountaintops or unmanned platforms. Accordingly, having a self-monitoring IoT device 102, which reports problems with operational parameters only when an alert limit is breached or if a breach is determined to be imminent, may improve the efficiency of using the IoT devices 102.

Figure 2:
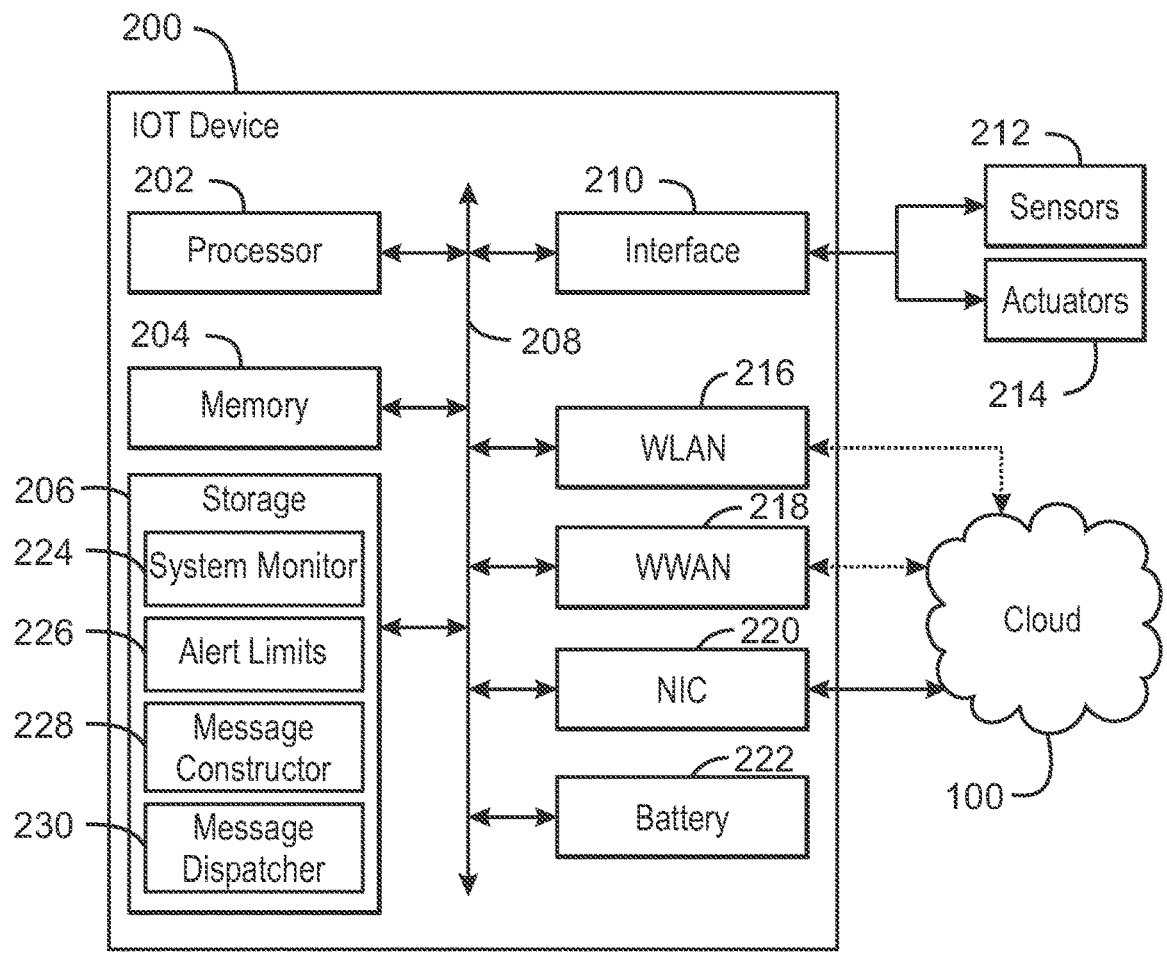
FIG. 2 is a block diagram of components that may be present in an IoT device used for self-monitoring and event reporting.

FIG. 2 is a block diagram of components that may be present in an IoT device 200 used for self-monitoring and event reporting. Like numbered items are as described with respect to FIG. 1. The IoT device 200 may include any combinations of the components. The components may be implemented as ICs, portions thereof, discrete electronic devices, or other modules, logic, hardware, software, firmware, or a combination thereof adapted in the IoT device 200, or as components otherwise incorporated within a chassis of a larger system. The block diagram of FIG. 2 is intended to show a high level view of components of the IoT device 200. However, some of the components shown may be omitted, additional components may be present, and different arrangement of the components shown may occur in other implementations. The IoT device 200 may be a remote weather station, a programmable logic controller (PLC) or remote terminal unit (RTU) in a SCADA (supervisory control and data acquisition) network, an alarm system device, a smart television, a cellular telephone, or any number of other IoT devices 102 as discussed with respect to FIG. 1.

As seen in FIG. 2, the IoT device 200 may include a processor 202, which may be a microprocessor, a multi-core processor, a multithreaded processor, an ultra-low voltage processor, an embedded processor, or other known processing element. The processor 202 may be a part of a system on a chip (SoC) in which the processor 202 and other components are formed into a single integrated circuit, or a single package. As an example, the processor 202 may include an Intel® Architecture Core™ based processor, such as an Atom, an i3, an i5, an i7 or another such processor available from Intel Corporation, Santa Clara, Calif. However, other low power processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. These processors may include units such as an apple A5/A6 processor, a Qualcomm Snapdragon processor, or TI OMAP processor.

The processor 202 may communicate with a system memory 204. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, one or more operating systems and so forth, a mass storage 206 may also couple to the processor 202. To enable a thinner and lighter system design the mass storage may be implemented via a solid state disk drive (SSDD). However, the mass storage may be implemented using a micro hard disk drive (HDD) in some IoT devices 200. Further, any number of new technologies may be used for the mass storage 206 in addition to, or instead of, the technologies described, such resistance change memories, phase change memories, holographic memories, or chemical memories, among others. For example, the IoT device 200 may incorporate the 3D XPOINT memories from Intel and Micron.

The components may communicate over a bus 208. The bus 208 may include any number of technologies, including industry standard architecture (ISA), extended ISA (EISA), peripheral component interconnect (PCI), peripheral component interconnect extended (PCIx), PCI express (PCIe), or any number of other technologies. The bus 208 may be a proprietary bus, for example, used in a SoC based system. Other bus systems may be used, such as the I2C interface, the SPI interfaces, and point to point interfaces, among others.

The bus 208 may couple the processor 202 to an interface 210 that is used to connect external devices. The external devices may include sensors 212, such as flow sensors, temperature sensors, motion sensors, wind speed sensors, pressure sensors, barometric pressure sensors, and the like. The interface 210 may be used to connect the IoT device 200 to actuators 214, such as valve actuators, lock solenoids, audible sound generators, visual warning devices, and the like.

While not shown, various input/output (I/O) devices may be present within, or connected to, the IoT device 200. For example, a display may be included to show information, such as sensor readings or actuator position. An input device, such as a touch screen or keypad may be included to accept input.

The IoT device 200 can communicate with a computing cloud network 100 in a variety of manners, including wirelessly. In the embodiment shown in FIG. 2, various wireless modules, each of which can correspond to a radio configured for a particular wireless communication protocol, may be present. As seen in FIG. 2, a WLAN unit 216 may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit 218. The IoT device 200 is not limited to these types of radio transceivers, but may include any number of other radio communications equipment, such as transceivers compatible with the Bluetooth® standard as defined by the Bluetooth® special interest group, For example, the IoT device 200 may communicate over a wireless personal area network (WPAN) according to the IEEE 802.15.4 standard, among others.

The IoT device 200 may include a network interface controller 220 to communicate with the cloud computing network 100 through an Ethernet interface. This may include communicating through a small wired or wireless network shared by number of IoT devices 200 that communicate with the cloud computing network 100 through a constrained gateway 118, as described with respect to FIG. 1. For example, the IoT device 200 may be part of an ad-hoc or mesh network in which a number of devices pass communications directly between each other, for example, following the optimized link state routing (OLSR) Protocol, or the better approach to mobile ad-hoc networking (B.A.T-.M.A.N.), among others. The mesh network communicate with the cloud through the constrained gateway 118.

The IoT device 200 may be powered by a local power source, such as a battery 222. The local power source may include any number of other units in addition to, or instead of the battery 222, such as solar cells or wind generators to charge a battery, among others.

The mass storage 206 may include a number of modules to implement the self-monitoring functions described herein. These modules may include a system monitor 224 that tracks a number of operational parameters, including such system metrics as memory usage, power usage, sensor operation, and storage capacity, among others. The system monitor 224 may compare the operational parameters to alert limits to determine when an alert message should be sent. The comparison may include determining when a trend indicates a breach of an alert limit may occur, such as determining that memory usage is continuously increasing over a number of hours, predicting when the memory usage will cross an alert limit, and sending out an alert message. Further, the system monitor 224 may compare multiple operational parameters to determine when to send an alert message, for example, varying an alert limit based on another parameter. For example, the system monitor 224 may use a temperature reading to determine when to send an alert message on a reserve capacity in the battery 222. During colder temperatures, the alert message may be sent out at a higher reserve capacity level, as the battery 222 may discharge faster under cold temperatures. The system monitor 224 may also obtain the alert limits 226, used to determine when to send the alert messages. This may be performed periodically, such as once a week, once a day, once an hour, and the like, or based on the number of iterations completed.

Once an alert limit is breached, a message constructor 228 may be used to assemble the alert message. Among other information, the alert message may include a timestamp indicating when the breach of the alert limit took place and the value of the system metric at the time the alert limit was breached. If an alert limit is based on a rate of change of an operational parameter, the message may include a predicted time when the operational parameter may pass the alert limit. The construction of the message and possible contents is discussed further with respect to FIG. 5.

A message dispatcher 230 may send the message to a server, or other target device. For example, the message dispatcher 230 may place the alert message into a message queue for a control system. Further, the message dispatcher 230 may use any number of communication techniques in addition to, or instead of the control system, such as sending a text message to a mobile device, placing an automated call to a phone number, sending out an e-mail, and the like.

Figure 3A:
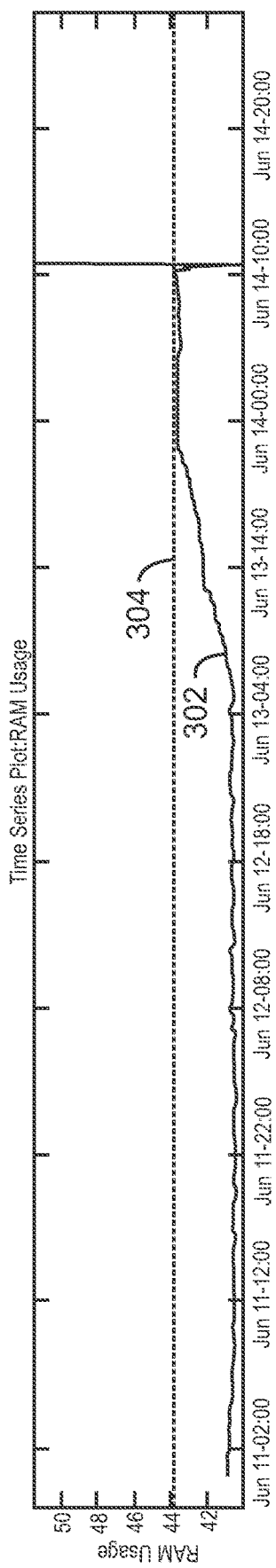
FIGS. 3A-3C are plots showing a potential reduction in network traffic for a self-monitoring IoT device.
Figure 3B:
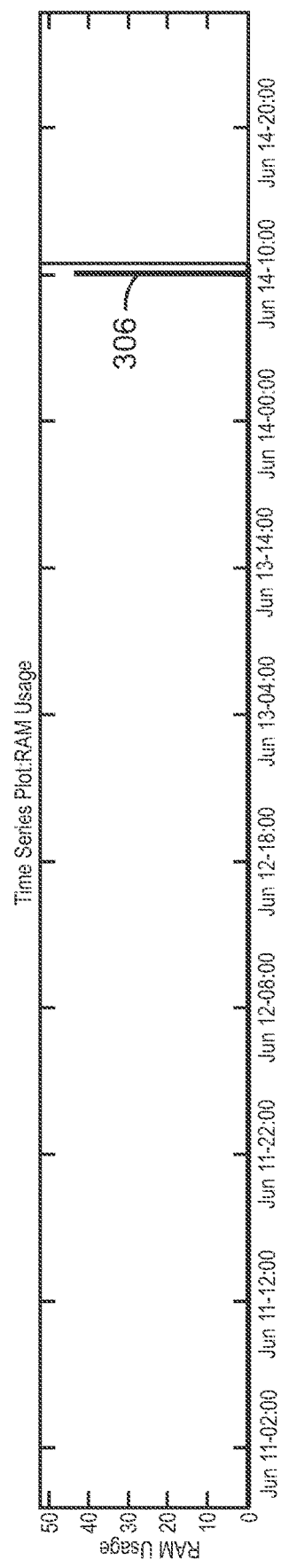
Figure 3C:
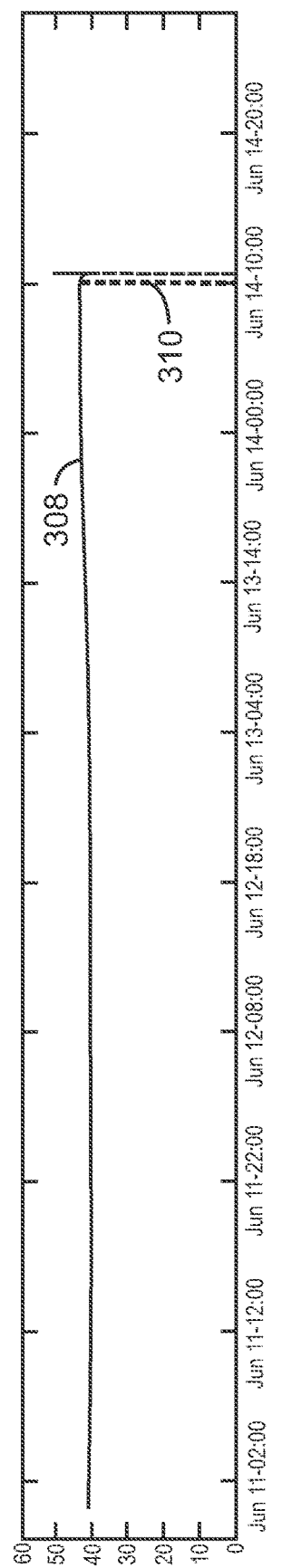

FIGS. 3A-3C are plots showing a potential reduction in network traffic for a self-monitoring IoT device. In this example, the system was used for an IoT device periodically reporting RAM usage information to a backend via message payloads comprising 700 bytes. FIG. 3A represents the RAM usage 302 over a period of hours, which may be continuously reported by an IoT device to a backend server in a telemetry stream. The message traffic in this example using a telemetry system was 3.316 MB.

The self-monitoring system was implemented to send an alert message only if the RAM usage exceeded an alert limit 304. FIG. 3B indicates when the device sent alert messages 306 when the alert limit was breached. The message traffic using the self-monitoring techniques described was 0.007 MB.

FIG. 3C is an overlay of both cases. A first plot 308 indicates the continuous message traffic, while a second plot 310 indicates the alert message traffic, sent when the alert limit 304 is breached. By enabling the device to manage its reporting behavior so that it only commenced reporting when the alert limit was breached, the traffic over the network was reduced by 3.309 MB or 99.8%.

Further, using this example information, the system may calculate a score denoting the severity of the breach of the alert limit 304. In this example, the alert limit 304 was set at 44%. If a maximum observed value in excess of the alert limit 304 was 51.5%, it may represent a breach of 18% above the alert limit. A weighting of 0.9 may be applied to the data to produce an overall alert score of 16/100 for the breach of the alert limit 304. From this, it may be determined that a breach did occur, but it was a relatively minor breach of the alert limit 304 according to the alert score.

Figure 4:
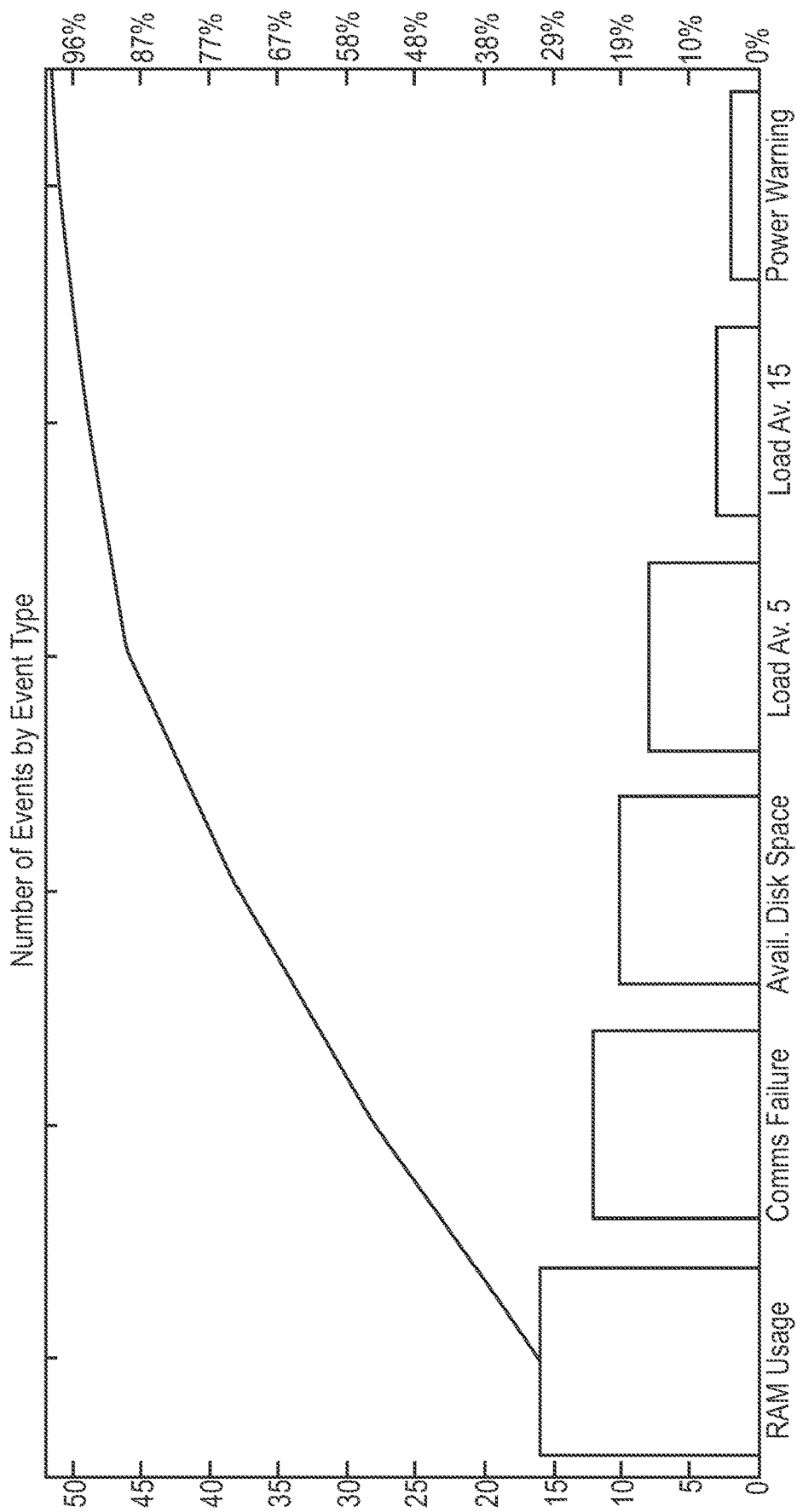
FIG. 4 is a plot of operational events by type for self-monitoring IoT devices.

FIG. 4 is a plot of operational events by type for self-monitoring IoT devices. Providing an IoT device with the capability to determine the type and frequency of breaches of alert limits, and to report this information to a server, the techniques may reduce the technical burden on system operators. This may allow faster diagnosis of device issues. The resulting information can be visualized on a Pareto diagram, as shown in FIG. 4. In this test example, breaches in an alert limit for RAM usage were the most frequently occurring events, and thus, the system operator may be notified that remedial action is required to maintain device uptime. Furthermore, by aggregating the breaches and only dispatching alert messages periodically, a significant reduction may be made in the device telemetry traffic and, therefore, the cost of conveying this information in both monetary and energy terms.

An example of an alert message payload in JSON (JavaScript Object Notation) format is provided below. The payload contains the maximum RAM usage detected, the alert score, and the timestamp of the event.

```
{
    "msg_type": "alert_msg",
    "account_id": "testdevice",
    "sender_id": "001320FDFFED ",
    "timestamp": "1434054270",
    "data_source": [
        {
            "name": "eventalert",
            "metrics": [
                {
                    "name": "ram-alert",
                    "sample": [
                        {
                            "timestamp": "1434054270",
                            "value": "51.5"
                        }
                    ]
                },
                {
                    "name": "ram-alert-score",
                    "sample": [
                        {
                            "timestamp": "1434054270",
                            "value": "16"
                        }
                    ]
                }
            ]
        }
    ]
}
```

Another example of an alert message that may be constructed is provided below. In this example, the alert limit represents a threshold for available disk space on the device. The message may include an accompanying alert score indicating the severity of the breach.

```
{
    "msg_type": "alert_msg",
    "account_id": "testdevice",
    "sender_id": "001320FDFFED ",
    "timestamp": "1434054270",
    "data_source": [
        {
            "name": "eventalert",
            "metrics": [
                {
                    "name": "disk-alert",
                    "sample": [
                        {
                            "timestamp": "1434054270",
                            "value": "80"
                        }
                    ]
                },
                {
                    "name": "disk-alert-score",
                    "sample": [
                        {
                            "timestamp": "1434054379",
                            "value": "25"
                        }
                    ]
                }
            ]
        }
    ]
}
```

An alert message is not limited to an informational message that may inform an operator of the breach, but may also include a recommendation or an actuation to mitigate the breach. The actuation may include a binary action, e.g., turning equipment on or off, or a variable action, e.g., adjusting a set point, partially opening a valve, and the like. In the binary example below, the IoT device has sensed that a temperature has breached a high alert limit at 90 degrees and sends an alert to switch a boiler off. In this example, the boiler alert score of '0' is the instruction to switch off.

```
{
    "msg_type": "alert_msg",
    "account_id": "testdevice",
    "sender_id": "001320FDFFED ",
    "timestamp": "1434054270",
    "data_source": [
        {
            "name": "eventalert",
            "metrics": [
                {
                    "name": "temperature",
                    "sample": [
                        {
                            "timestamp": "1434054270",
                            "value": "90"
                        }
                    ]
                },
                {
                    "name": "boiler- alert-score ",
                    "sample": [
                        {
                            "timestamp": "1434054379",
                            "value": "0"
                        }
                    ]
                }
            ]
        }
    ]
}
```

In the variable actuation example below, the IoT device has sensed that a moisture level has breached a lower alert limit at 5 ppmv (parts per million by volume), and sends an alert to switch on the sprinklers to a sprinkler setting of 15. The sprinkler settings could range for example from 0-30 in this case, thus opening the sprinkler to 50% capacity.

```
{
    "msg_type": "alert_msg",
    "account_id": "testdevice",
    "sender_id": "001320FDFFED ",
    "timestamp": "1434054270",
    "data_source": [
        {
            "name": "eventalert",
            "metrics": [
                {
                    "name": "moisture",
                    "sample": [
                        {
                            "timestamp": "1434054270",
                            "value": "5"
                        }
                    ]
                },
                {
                    "name": "sprinkler-alert-score
", "sample": [
                        {
                            "timestamp": "1434054379",
                            "value": "15"
                        }
                    ]
                }
            ]
        }
    ]
}
```

Figure 5:
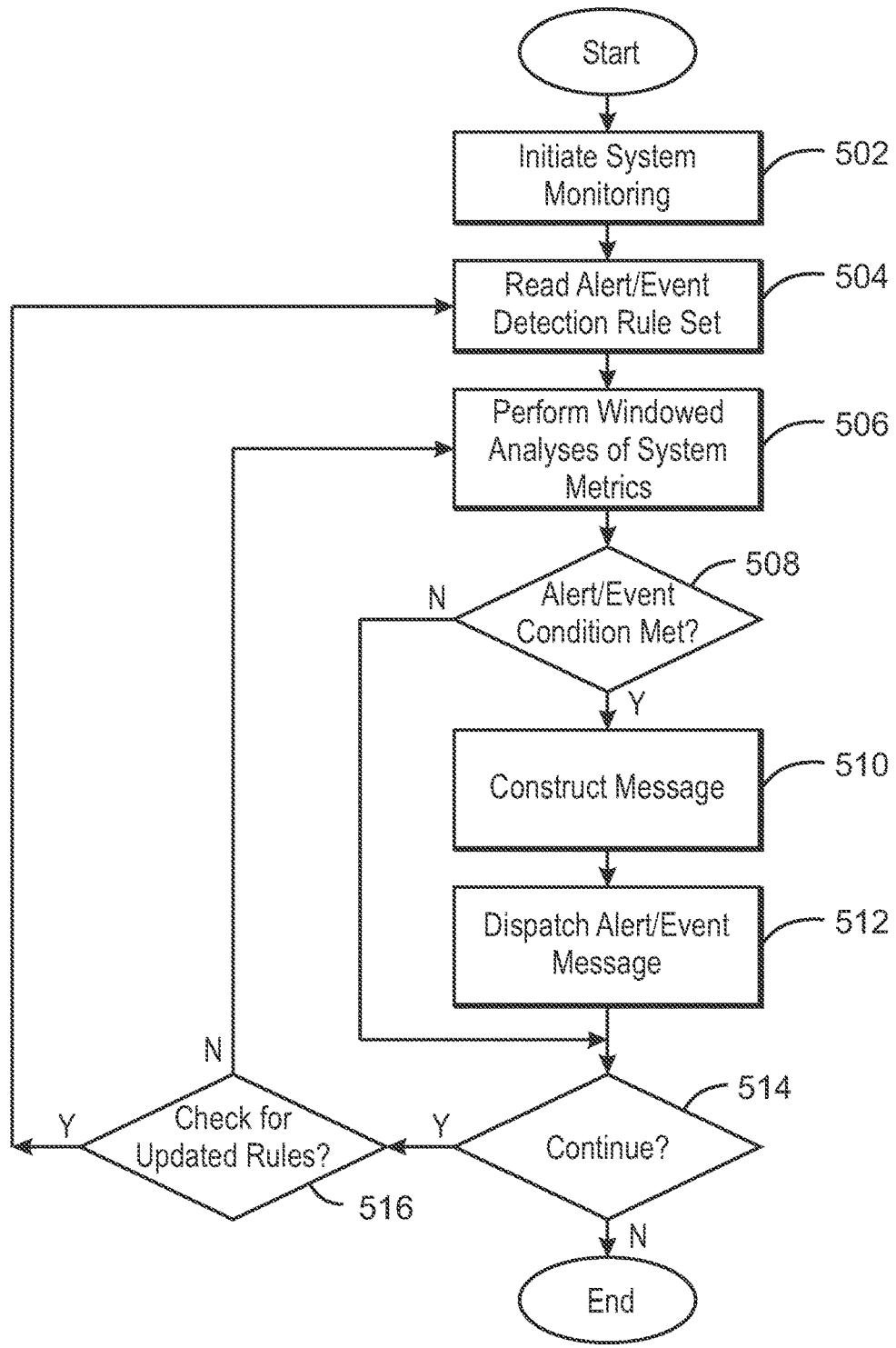
FIG. 5 is a process flow diagram of a method 500 for monitoring an IoT device for breaches of alert limits.

FIG. 5 is a process flow diagram of a method 500 for monitoring an IoT device for breaches of alert limits. The method 500 begins at block 502, when the current operational metrics of the system are logged and stored in a database on the IoT device. It may use operating system calls to access the current operational metrics. These include, but are not limited to, the amount of RAM used, remaining storage space, load averages over a five, fifteen and sixty minute intervals, reserve battery capacity, and the like. In some examples, the operational metrics may reflect the operation of other systems, such as a coupled sensor. For example, the operational parameters may indicate a potential failure of a barometric pressure sensor by monitoring the rate of change of the values measured by the sensor. These breaches of alert limits are parsed and the value and timestamp associated with their occurrence may be stored locally. This may be, for example, in a datastore or in a database table on the device, e.g., in a SQLite database or a TinyDB database, among others. As used herein, a datastore may include files saved in a file structure, such as text files, comma delimited files, and the like.

At block 504, an alert detection ruleset including alert limits is retrieved. Two functions may be performed to implement this process. The ruleset may be retrieved from either a local on device source or via a remote source, e.g. a RESTful query, an HTTP GET, or other response requests, to a remote web service. Further, incoming ruleset updates are managed either locally or remotely.

At block 506, a windowed analysis of the recorded metric observations is performed. A windowed approach means that the last N samples or metric observations between a configurable start time and present time are used as part of the analysis process.

The analyses include rate of change, absolute value or magnitude, breach detection, and general failures. Any number of other statistical analyses may be used in addition to, or instead of, the window analysis, such as averaging, cross correlation, and the like. As used herein, a rate of change analysis involves comparing the rate change of a system metric from the windowed sample set against an alert limit. An absolute value or magnitude analysis involves comparing a single sample value from the windowed sample set against an alert limit. A threshold detection involves determining whether one or more of the windowed samples breaches an alert limit, thus triggering an alert condition. General failures are observed by the presence of an error report or a failure to return the expected outcome.

A second order telemetry process may be used to determine a violation of the alert limit. In this process, a weighted alert scoring system may be used in which the severity of the breach of the alert limit is calculated using a combination of two factors. The first factor is the maximum value of the observed metric in excess of the user-specified and configurable alert limit. This value may be converted to a percentage of the alert limit to indicate the severity of the breach of the alert limit, and then a configurable weighting may be applied to this percentage. The combination of these approaches produces a final per-metric figure which may indicate that an alert condition has occurred and may provide a measure of the severity of the breach.

At block 508, the results of the analysis are compared against the ruleset. This is a threshold operation, e.g., it returns a no decision if the particular result satisfies the defined rule or alert limit and a yes decision if the result breaches the alert limit. The determination may be configured to act based on the severity of the event, for example, if the severity of the breach of the alert limit is greater than a configurable severity level then the method 500 proceeds to block 510.

At block 510, the current timestamp of the device is retrieved and the content of the message is constructed, e.g., including the timestamp, the value and identity of the parameter that resulted in the breach of the alert limit, and a derived level of priority, among others. The alert message does not have to include any of these values, but may be a bare alert message that an IoT device needs servicing, e.g., in cases in which the bandwidth to the device is low. The message payload may converted to the required format e.g. JSON, XML, or CSV, among others.

At block 512, the alert message is transmitted to a remote system or device. For example, a connection is initiated with the destination server and the message is dispatched using the appropriate transport protocol, e.g., MQTT, COAP, HTTP, DDS, or XMPP, among others.

If, at block 508, if the severity of the breach of the alert limit is less than a configurable severity level then the alert type may be stored locally on the device and the frequency of the alert type may be dispatched at a configurable periodic interval. This may enable the system operator to perform a Pareto analysis. The process flow then proceeds to block 514.

At block 514, a determination is made as to whether monitoring is to continue. A no decision may result in the monitoring agent ceasing to monitor the system, e.g., it may be scheduled to only monitor periodically or when resource utilization is low.

If the determination at block 514 is that monitoring should continue, process flow proceeds to block 516 to determine if the IoT device should check for an updated ruleset. If so, process flow returns to block 504 to restart the process. If not, process flow returns to block 506 to continue the monitoring.

Figure 6:
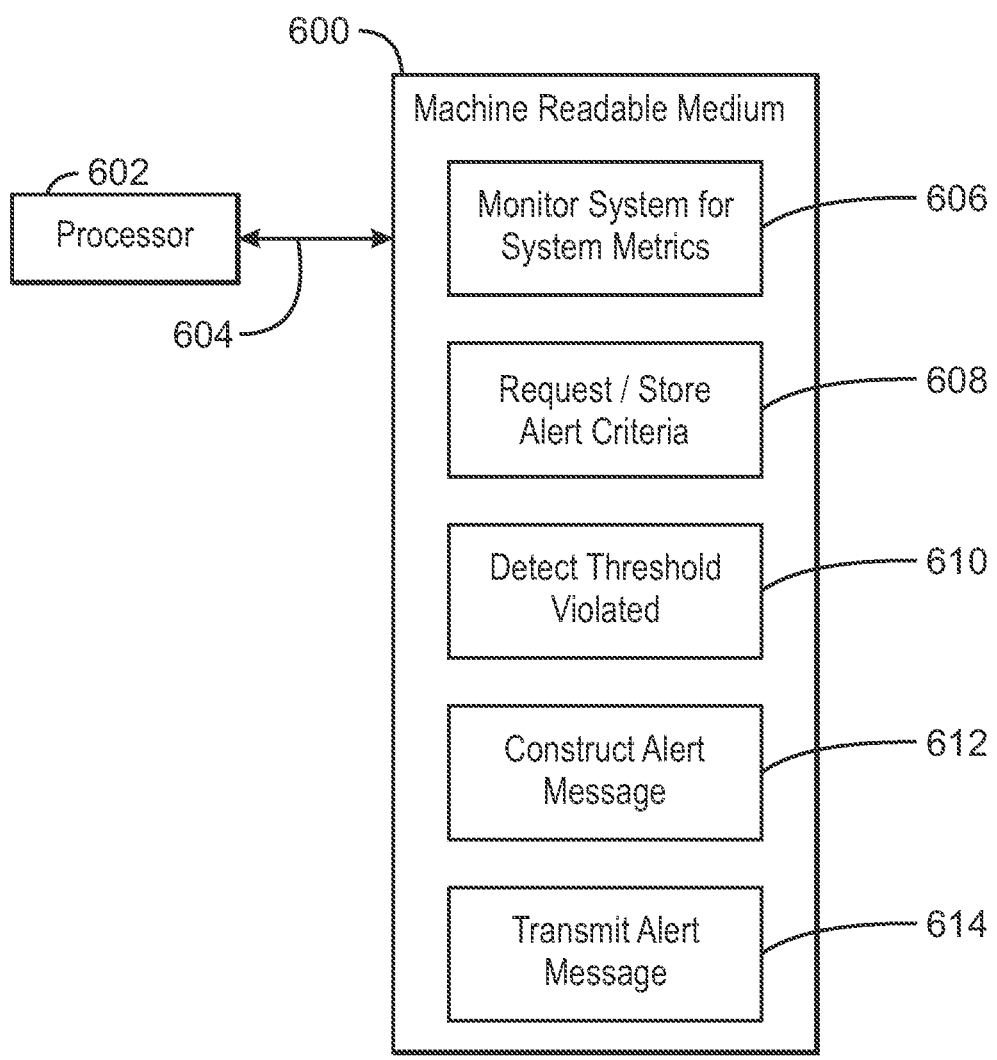
FIG. 6 is a block diagram of a non-transitory, machine readable medium 600 including code to direct a processor 602 to monitor an IoT device for breaches of alert limits.

FIG. 6 is a block diagram of a non-transitory, machine readable medium 600 including code to direct a processor 602 to monitor an IoT device for breaches of alert limits. The processor 602 is coupled to the non-transitory, machine readable medium 600 over a bus 604. The bus 604 may be as described with respect to the bus 208 of FIG. 2.

The non-transitory, machine readable medium 600 may include code 606 to direct the processor 602 to monitor the system for system metrics. Code 608 may be included to direct the processor 602 to request and store alert criteria. Code 610 may be included to direct the processor 602 to detect whether a threshold violation occurred, for example, using a windowed analysis as described herein. Code 612 may be included to direct the processor 602 to construct an alert message. Further, code 614 may be included to direct the processor 602 to transmit the alert message, for example, to a server or other device.

EXAMPLES

Example 1 includes an apparatus for apparatus for monitoring an operational parameter. The apparatus includes an Internet of Things (IoT) device, wherein the IoT device includes a processor, a communications device configured to transmit data to a central server, and a storage device. The storage device includes code to direct the processor to monitor an operational parameter for the IoT device, compare the operational parameter to an alert limit. If the operational parameter breaches the alert limit, the code directs the processor to construct an alert message. The code then directs the processor to transmit the alert message to a server.

Example 2 incorporates the subject matter of Example 1. In this example, the alert message includes a value for the operational parameter and a timestamp indicating a time the operational parameter passed the alert limit.

Example 3 incorporates the subject matter of any of Examples 1 and 2. In this example, the IoT device includes a local power supply. The alert limit includes a reserve capacity in the local power supply and the code directs the processor to transmit the alert message if the reserve capacity of the local power supply falls below the alert limit.

Example 4 incorporates the subject matter of any of Examples 1, 2, and 3. In this example, the IoT device includes a memory. The alert limit includes an amount of memory in use and the code directs the processor to transmit the alert message if the amount of memory in use exceeds the alert limit.

Example 5 incorporates the subject matter of any of Examples 1 through 4. In this example, the alert limit includes a loading of the processor and the code directs the processor to transmit the alert message if the loading on the processor exceeds the alert limit.

Example 6 incorporates the subject matter of any of Examples 1 through 5. In this example, the IoT device includes a sensor interface that is coupled to a sensor and the alert limit includes a measurement of a functionality of the sensor. The code directs the processor to transmit the alert message if the measurement of the functionality of the sensor passes the alert limit.

Example 7 incorporates the subject matter of any of Examples 1 through 6. In this example, the IoT device includes an actuator interface that is coupled to an actuator. The alert limit includes a measurement of a functionality of the actuator and the code directs the processor to transmit the alert message if the measurement of the functionality of the actuator passes the alert limit.

Example 8 incorporates the subject matter of any of Examples 1 through 7. In this example, the IoT device is in a mesh network with a plurality of other IoT devices.

Example 9 incorporates the subject matter of any of Examples 1 through 8. In this example, the communications device includes an Ethernet interface.

Example 10 incorporates the subject matter of any of Examples 1 through 9. In this example, the communications device includes a wireless local area network (WLAN) transceiver.

Example 11 incorporates the subject matter of any of Examples 1 through 10. In this example, the communications device includes a wireless wide area network (WWAN) transceiver.

Example 12 incorporates the subject matter of any of Examples 1 through 11. In this example, the IoT device includes a remote device.

Example 13 incorporates the subject matter of any of Examples 1 through 12. In this example, the IoT device includes a supervisory control and data acquisition (SCADA) device.

Example 14 includes a method for monitoring an Internet of Things (IoT) device. The method includes performing a statistical analysis of a system metric and determining if an alert limit is breached. If so, the method includes constructing an alert message and dispatching the alert message to a server.

Example 15 incorporates the subject matter of Example 14 In this example, the method includes performing a windowed analysis of the system metric.

Example 16 incorporates the subject matter of any of Examples 14 and 15. In this example, the method includes issuing a system command to read the system metric.

Example 17 incorporates the subject matter of any of Examples 14 through 16. In this example, the method includes storing the system metric in a datastore local to the IoT device.

Example 18 incorporates the subject matter of any of Examples 14 through 17. In this example, the method includes obtaining a rule set that includes the system metric.

Example 19 incorporates the subject matter of any of Examples 14 through 18. In this example, the method includes issuing a request response command to access the rule set.

Example 20 incorporates the subject matter of any of Examples 14 through 19. In this example, determining if an alert condition is met includes correlating two system metrics.

Example 21 incorporates the subject matter of any of Examples 14 through 20. In this example, determining if an alert condition is met includes a second order telemetry process including obtaining a maximum value of the system metric in excess of the alert limit, converting the maximum value to a percentage of the alert limit, and applying a configurable weighting to this percentage.

Example 22 incorporates the subject matter of any of Examples 14 through 21. In this example, the method includes checking for an update to the rule set after an iteration.

Example 23 incorporates the subject matter of any of Examples 14 through 22. In this example, constructing the alert message includes inserting a time of occurrence for the breach of the alert limit into the alert message, and inserting the value of the system metric at the time of occurrence into the alert message.

Example 24 incorporates the subject matter of any of Examples 14 through 23. In this example, performing the windowed analysis includes testing for a breach of the alert limit and calculating a weighted score.

Example 25 is a non-transitory, machine readable medium including code to direct a processor to monitor an internet of things (IoT) device for a system metric, detect that an alert limit has been breached, and construct an alert message.

Example 26 incorporates the subject matter of Example 25. In this example, the non-transitory, machine readable medium includes code to direct the processor to obtain a rule set including the alert limit.

Example 27 incorporates the subject matter of any of Examples 25 and 26. In this example, the non-transitory, machine readable medium includes code to direct the processor to transmit the alert message.

Example 28 incorporates the subject matter of any of Examples 25 through 27. In this example, the non-transitory, machine readable medium includes code to direct the processor to store the value of the system metric in a datastore local to the IoT device.

Example 29 incorporates the subject matter of any of Examples 25 through 28. In this example, the non-transitory, machine readable medium includes code to direct the processor to check for an update to a ruleset after an iteration.

Example 30 incorporates the subject matter of any of Examples 25 through 29. In this example, the non-transitory, machine readable medium includes code to direct the processor to obtain a sensor reading from a sensor coupled to the IoT device through an interface.

Example 31 is an apparatus for monitoring operational parameters, including an Internet of Things (IoT) device, wherein the IoT device includes a means for monitoring an operational parameter in the IoT device, a means for comparing the operational parameter to an alert limit, a means for constructing an alert message for an operational parameter outside of the alert limit, and a means for transmitting the alert message to a server.

Example 32 includes the subject matter of Example 31. In this example, the IoT device includes means for communicating over an Ethernet interface.

Example 33 includes the subject matter of any of Examples 31 and 32. In this example, the IoT device includes means for communicating over a wireless local area network (WLAN).

Example 34 includes the subject matter of any of Examples 31 through 33. In this example, the IoT device includes means for communicating over a wireless wide area network (WWAN).

Example 35 includes the subject matter of any of Examples 31 through 34. In this example, the IoT device includes means for establishing a mesh network.

Example 36 is an Internet of Things (IoT) device. The IoT device includes a processor, a communications device configured to transmit data to a central server, and a storage device. The storage device includes code to direct the processor to monitor an operational parameter for the IoT device, compare the operational parameter to an alert limit, construct an alert message, and transmit the alert message to a server.

Example 37 includes the subject matter of Example 36. In this example, the alert message includes a value for the operational parameter, and a timestamp indicating a time the operational parameter passed the alert limit.

Example 38 includes the subject matter of any of Examples 36 and 37. In this example, the IoT device includes a local power supply, and the alert limit includes a reserve capacity in the local power supply. The code directs the processor to transmit the alert message if the reserve capacity of the local power supply falls below an alert limit.

Example 39 includes the subject matter of any of Examples 36 through 38. In this example, the IoT device a memory, and the alert limit includes an amount of memory in use. The code directs the processor to transmit the alert message if the amount of memory in use exceeds the alert limit.

Example 40 includes the subject matter of any of Examples 36 through 39. In this example, the communications device includes an Ethernet interface.

Example 41 includes the subject matter of any of Examples 36 through 40. In this example, the communications device includes a wireless local area network (WLAN) transceiver.

Example 42 includes the subject matter of any of Examples 36 through 41. In this example, the communications device includes a wireless wide area network (WWAN) transceiver.

Example 43 includes the subject matter of any of Examples 36 through 42. In this example, the communications device includes a Bluetooth® transceiver.

Example 44 includes the subject matter of any of Examples 36 through 43. In this example, the IoT device includes a remote device.

Example 45 includes the subject matter of any of Examples 36 through 44. In this example, the IoT device includes a supervisory control and data acquisition (SCADA) device.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An Internet of Things (IoT) device comprising:
a processor;
a communications device configured to transmit to a device that is external to the IoT device; and
storage comprising code to direct the processor to:
while the IoT device is operating, read an alert limit, the alert limit acting as a threshold for an operational parameter, wherein the operational parameter relates to a remaining power supply;
read a temperature;
modify the alert limit for the remaining power supply based, at least in part, on the temperature;
compare the operational parameter for the IoT device to the modified alert limit; and
in response to the comparison of the operational parameter to the modified alert limit, cause the communications device to transmit an alert message to the device that is external to the IoT device.

2. The IoT device of claim 1, wherein the alert message comprises:
a value for the operational parameter for the IoT device; and
an indication of a time when the value is predicted to cross the alert limit.

3. The IoT device of claim 1, wherein:
the IoT device comprises a power supply; and
the code to direct the processor to transmit the alert message if a reserve capacity of the power supply falls below the alert limit.

4. The IoT device of claim 1, wherein the IoT device is in a mesh network with a plurality of other IoT devices.

5. The IoT device of claim 1, wherein the communications device comprises a wireless local area network (WLAN) transceiver or a wireless wide area network (WWAN) transceiver.

6. The IoT device of claim 1, wherein the operational parameter includes reserve battery capacity.

7. An Internet of Things (IoT) device comprising:
a processor; and
storage comprising code to direct the processor to:
monitor a plurality of operational parameters for the IoT device;
read a value of a first operational parameter of the plurality of operational parameters;
modify an alert limit for a second operational parameter based on the value of the first operational parameter, wherein the second operational parameter relates to a remaining power supply; and
compare the second operational parameter of the monitored operational parameters to the modified alert limit to determine when to send an alert message.

8. The IoT device of claim 7, wherein the alert message comprises:
a value for one of the monitored operational parameters; and
an indication of a time when the value is predicted to cross the alert limit.

9. The IoT device of claim 7, comprising:
transmitting the alert message if a reserve capacity of a power supply of the IoT device falls below the alert limit; and
adjusting the alert limit based, at least in part, on a temperature.

10. The IoT device of claim 7, wherein the IoT device is in a mesh network with a plurality of other IoT devices.

11. A method for monitoring an Internet of Things (IoT) device, comprising:
reading a temperature;
modifying an alert limit from a first limit to a second limit for an operational parameter for the IoT device based, at least in part, on the temperature, wherein the operational parameter relates to a remaining power supply;
comparing the operational parameter for the IoT device to the modified alert limit; and
in response to the comparing of the operational parameter to the modified alert limit, transmitting an alert message to a device that is external to the IoT device.

12. The method of claim 11, wherein the alert message comprises:
a value for the operational parameter for the IoT device; and
an indication of a time when the value is predicted to cross the alert limit.

13. The method of claim 11, comprising transmitting the alert message if a reserve capacity of a power supply of the IoT device falls below the alert limit.

14. The method of claim 11, wherein the IoT device is in a mesh network with a plurality of other IoT devices.

15. A method for monitoring an Internet of Things (IoT) device, comprising:
monitoring a plurality of operational parameters for the IoT device;
modifying an alert limit for a second operational parameter of the plurality of operational parameters from a first limit value to a second limit value based on a first operational parameter of the monitored plurality of operational parameters for the IoT device, wherein the second operational parameter relates to a remaining power supply; and
comparing the second operational parameter of the monitored operational parameters to the modified alert limit to determine when to send an alert message.

16. The method of claim 15, wherein the alert message comprises:
a value for one of the monitored operational parameters; and
an indication of a time when the value is predicted to cross the alert limit.

17. The method of claim 15, comprising:
transmitting the alert message if a reserve capacity of a power supply of the IoT device falls below the alert limit; and
adjusting the alert limit based, at least in part, on a temperature.

18. The method of claim 15, wherein the IoT device is in a mesh network with a plurality of other IoT devices.

19. A non-transitory, machine readable medium comprising code to direct a processor in an internet of things (IoT) device to:
modify an alert limit for an operational parameter based, at least in part, on a temperature;
compare the operational parameter for the IoT device to the modified alert limit, wherein the operational parameter relates to a remaining power supply; and
in response to the comparing of the operational parameter to the modified alert limit, transmit an alert message to a device that is external to the IoT device.

20. The non-transitory, machine readable medium of claim 19, wherein the alert message comprises:
a value for the operational parameter for the IoT device; and
an indication of a time when the value is predicted to cross the alert limit.

21. The non-transitory, machine readable medium of claim 19, comprising code to direct the processor to transmit the alert message if a reserve capacity of a power supply of the IoT device falls below the alert limit.

22. The non-transitory, machine readable medium of claim 19, wherein the IoT device is in a mesh network with a plurality of other IoT devices.

23. A non-transitory, machine readable medium comprising code to direct a processor in an internet of things (IoT) device to:
monitor a plurality of operational parameters for the IoT device;
modify an alert limit based on a first of the monitored operational parameters for the IoT device; and
compare a second of the monitored operational parameters to the modified alert limit to determine when to send an alert message, wherein the second operational parameter relates to a remaining power supply.

24. The non-transitory, machine readable medium of claim 23, wherein the alert message comprises:
a value for one of the monitored operational parameters; and
an indication of a time when the value is predicted to cross the alert limit.

25. The non-transitory, machine readable medium of claim 23, comprising code to direct the processor to:
transmit the alert message if a reserve capacity of a power supply of the IoT device falls below the alert limit; and
adjust the alert limit based, at least in part, on a temperature.

26. The non-transitory, machine readable medium of claim 23, wherein the IoT device is in a mesh network with a plurality of other IoT devices.

* * * * *